April 5, 1960
L. CRANDALL
2,931,261
PLUG INSERTING DEVICE FOR TUBELESS TIRES
Filed Sept. 10, 1956
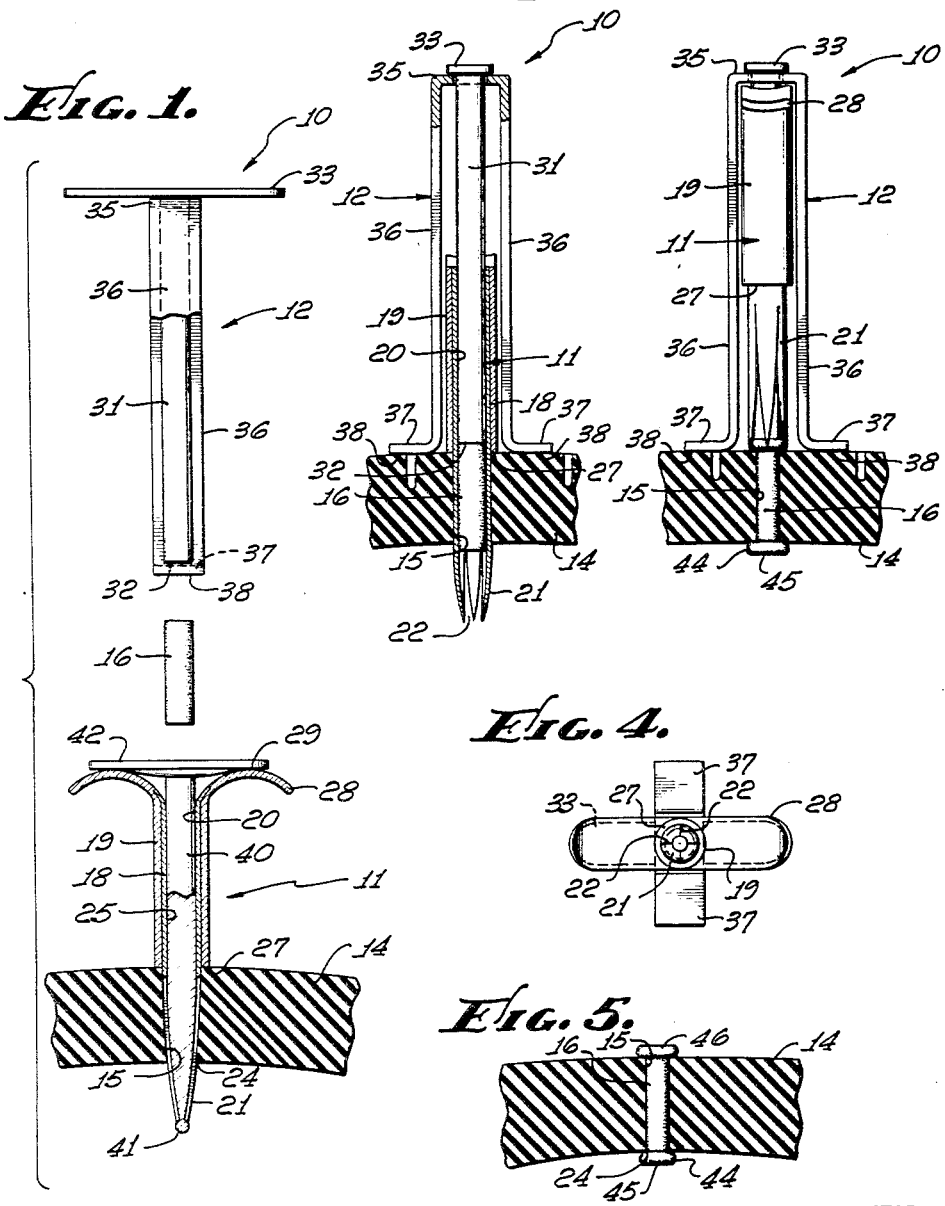
INVENTOR.
LOID CRANDALL
BY
ATTORNEY.

United States Patent Office 2,931,261
Patented Apr. 5, 1960

2,931,261

PLUG INSERTING DEVICE FOR TUBELESS TIRES

Loid Crandall, Alhambra, Calif.

Application September 10, 1956, Serial No. 608,993

4 Claims. (Cl. 81—15.7)

This invention relates to a tire repair device and a method of repairing a puncture hole in a tubeless tire; and more particularly to a repair device for punctures in tubeless tires by utilizing a solid resilient plug.

Present practice in repairing punctures, such as nail holes, in tubeless automobile tires requires removal of the tubeless tire from the tire rim. A patch of suitable rubber composition is then applied to the internal surface of the tire over the nail hole. Such methods of repairing punctures in tubeless tires have several disadvantages, namely, the tire must be removed from the rim and it is often difficult to reseal the tire on the rim when the repair is completed; special equipment is required to remove the tire from the rim and repair cannot be made without great difficulty in the absence of such special equipment; and there is no convenient way to test the effectiveness of the patch until the tire is again properly sealably mounted on the tire rim.

Prior proposed methods of repairing tubeless tires have also included shooting rubber bands or rubber elements into a puncture hole utilizing devices similar to those for repairing bicycle tires. These, however, have not been practical with tubeless tires because of the different construction of a tubeless tire and the presence of reinforcing fabric or cords in the tire wall which made withdrawal of such prior devices from the wall uncertain because of snagging of the device on such fabric and cords.

This invention contemplates a tubeless tire puncture repair device in which a puncture hole is first expanded to permit the convenient insertion of a solid plug of suitable resilient deformable material into the expanded puncture hole. The invention contemplates means for longitudinally positioning the plug in said hole and then withdrawing the expanding means while holding the plug in selected position. When the expanding means is completely withdrawn, the resilient character of the tire wall contracts the expanded hole and tightly grips the solid plug. Ends of the plug extend beyond the exterior and interior surface of the tire so that the portion of the plug between the ends is contracted to a diameter smaller than its normal diameter and the ends of the plug become slightly enlarged. Inside the tire, an internal pressure face is thus provided on the inner end of the plug whereby pressure fluid in the tire tends to press the inner end against margins of the puncture hole to facilitate sealing thereof. The outer end of the plug may also include a pressure face which acts against the adjacent exterior tire surface to restrain the plug against movement into the tire. The solid plug thus provides an effective puncture repair of self-sealing characteristics because of the internal pressure face provided by the enlarged inner end of the plug and the outer plug holding end.

The primary object of this invention therefore is to provide a repair device for use with tubeless tires utilizing a solid resilient repair plug for puncture holes.

An object of this invention is to provide a method of repairing punctures in tubeless tires by means of a solid resilient plug.

Another object of this invention is to provide a repair device for inserting and positioning a solid plug in a puncture hole in such a manner that an internal pressure face is afforded by the plug for sealing against internal margins of the puncture hole.

A still further object of this invention is to provide a tubeless tire puncture repair device in which a puncture hole in the tire may be repaired without removing the tire from the tire rim.

A more specific object of this invention is to provide a tubeless tire puncture repair device which is convenient to load with a repair plug, which is constructed to positively and precisely position a repair plug in a puncture hole, and which may be readily withdrawn from a tire without disturbing the position of the repair plug.

Various other objects and advantages of this invention will be readily apparent to those skilled in the art from the following description of the drawings in which an exemplary embodiment of this invention is shown.

In the drawings:

Fig. 1 is an exploded view of a repair device embodying this invention, partly in section, and showing a hole-expanding means inserted in a puncture hole in a tire.

Fig. 2 is an elevational view partly in section of the device in Fig. 1 showing the device after the plug has been positioned with respect to the puncture hole.

Fig. 3 is a view similar to Fig. 2 showing the device of Fig. 1 with the hole-expanding means substantially withdrawn.

Fig. 4 is a bottom view of the device shown in Fig. 1.

Fig. 5 is a sectional view through a tire showing the puncture hole with a plug inserted and positioned therein by the device of this invention.

A tire repair device of the present invention is generally indicated at 10 and includes a puncture hole-expanding means 11 and a cooperable combined plunger and stop means generally indicated at 12. In Fig. 1, a section of a tire 14 is illustrated with expanding means 11 inserted through a puncture hole 15 in the tire. A repair plug 16 is indicated in the exploded view between the expanding means 11 and the plunger and stop means 12.

The puncture hole-expanding means 11 may comprise a hollow guide sleeve 18 of suitable resilient thin section metal, said guide sleeve 18 being secured within a reinforcing or stiffening tube 19 which is sleeved over the upper portion of sleeve 18. The internal diameter of guide sleeve 18 is of a dimension to slidably receive a selected plug 16 having an outer diameter only slightly less than the internal diameter of sleeve 18 so as to provide a convenient sliding fit. At one end, guide sleeve 18 is provided with an elongated tapered portion 21 which normally closes a through bore 20 provided by said sleeve. The tapered end portion 21 may be longitudinally split or quartered as at 22 so as to permit said tapered end to expand outwardly.

A solid probe 40 is positionable within bore 20 and has a tapered bottom section corresponding to the non-expanded tapered end portion 21 so as to virtually completely fill bore 20 throughout its length to facilitate entry of means 11 into the hole 15. Probe 40 includes a ball shaped tip 41 to assist entry of the probe into the hole 15 and to facilitate withdrawal through portion 21. A top cross member 42 on probe 40 provides a pressure surface.

The upper portion of bore 20 provides a plug reception or charging chamber 25 and is of sufficient length to hold a plug 16 with the top end face of plug 16 below the top of the hole-expanding means 11.

The tube 19 provides downwardly facing annular end face 27 adapted to abut the top margins of the tire 14 surrounding puncture hole 15 so as to limit depth of insertion of the hole-expanding device 11. At its upper end, tube 19 is provided with sidewardly extending curved finger-engagement portion 28, the top of said finger-engagement portions providing a pressure face 29 against which a hand may be positioned for pressing and forcing the hole-expanding means 11 into the puncture hole 15.

The plunger and stop means 12 includes a plunger portion 31 of elongated cylindrical form having a diameter which will permit slidable reception into bore 20 of hole-expanding means 11. The plunger portion 31 includes a bottom end face 32 adapted for pressure contact with the top end face of plug 16. The upper end of plunger portion 31 is provided with a laterally extending pressure member 33 against which a hand may be positioned for pressing the plunger and stop means toward a tire wall being repaired.

Carried by plunger portion 31 is a stop member 35, said stop member 35 being of U-shape and comprising legs 36 which receive therebetween in parallel relation the plunger portion 31 and which terminate in outwardly directed feet 37 provided with tire abutment faces 38 adapted to contact the exterior surface of a tire adjacent the puncture. The abutment face 32 of plunger portion 31 is spaced inwardly from faces 38 on stop member 35 so that when the faces 38 abut an exterior tire surface, plunger abutment face 32 will be positioned a selected distance above the surface of the tire. Such arrangement of stop member 35 and plunger portion 31 provides for precise accurate positioning of a plug 16 in the puncture hole as more fully described later.

The solid cylindrical repair plug 16 may be made of any suitable rubber or rubber composition material of tough resilient and deformable characteristics. Plug 16 may have an outer diameter larger than the diameter of a puncture hole. The length of plug 16 is greater than the thickness of the wall or wall and thread of a tire to be repaired. It will readily be understood that in the drawings the diameter of plug 16 is exaggerated in order to facilitate explanation and visualization of the operation of this invention. It is also understood that plugs 16 may be made of different diameter and length, and that the hole-expanding means 11 and plunger portion 31 may be made of different diameter to accommodate the different sizes of plugs 16.

The method of repairing a puncture hole in a tire 14 by using the tire repair device 10 of this invention comprises first inserting the hole-expanding means 11 including probe 40 into puncture hole 15. This is readily accomplished by first lubricating the tapered end portion 21 of guide sleeve 18 with a suitable lubricant such as a rubber cement or bonding agent having a relatively slow setting time. Pressure applied to probe cross member 42 will readily cause insertion of means 11 into the puncture hole to a selected depth determined by abutment of edge face 27 of tube 19 with the exterior surface of the tire. In this fully inserted position of expanding means 11, the tapered end portion 21 projects within the interior of the tire. Probe 40 is then withdrawn through and from sleeve 18.

A selected plug 16 may be coated with a rubber cement or bonding agent for lubricating thereof and is then inserted into guide sleeve 18. Plug 16 will assume a position therein with the bottom end of plug 16 at the upper end of the split end portions 21. The plunger and stop means 12 may then be positioned over expanding means 11 and the plunger portion 31 inserted into bore 20 above plug 16. Pressure on pressure member 33 drives plunger portion 31 toward tire 14 and drives plug 16 into tapered end portion 21 which is expanded thereby. Movement of plunger 31 toward the tire is stopped by stop member 35 when abutment faces 38 on feet 37 contact the exterior surface of the tire. In this position, the top end of plug 16 is positioned above the exterior surface of the tire and the bottom end of plug 16 is positioned below the interior surface of the tire.

Withdrawal of the hole-expanding means 11 may then be readily accomplished by placing a hand over pressure member 33 and curving fingers of the hand underneath the finger-engagement portion 28 of the hole-expanding means 11. Closing of the hand by tightening of the fingers causes the hole-expanding means to slide upwardly on plunger portion 31 within stop member 35. As the sleeve 18 is moved upwardly, the expanded tapered end portion 21 thereof further expands and slides over and by plug 16. Plug 16 is prevented from moving upwardly by continuous pressure contact of face 32 on the plunger portion with the top of the plug. When the hole-expanding means 11 is completely withdrawn (Fig. 3) the tire repair device 10 may be conveniently lifted off the tire. It will be noted that during the withdrawal operation, the plunger and stop means 12 serves as a support or brace for the hand to facilitate withdrawal of the hole-expanding means 11.

Fig. 5 shows a plug inserted and positioned in a tire wall after the device 10 has been removed. It will be noted that the resilient tire wall has caused contraction of the expanded puncture hole so as to tightly and sealably contain and grip that portion of the plug between its ends. Inner end 44 of said plug is slightly expanded and enlarged because of flow of rubber material toward the ends caused by contraction of the puncture hole. The expanded inner end 44 is greater in cross-sectional area than the normal cross-section area of plug 16. There is thus provided an enlarged internal pressure face 45 on the inner end 44 of the plug against which pressure fluid in the tire will act to seal enlarged end 44 against margins 24 of the puncture hole. Thus positive means are provided for preventing pressure fluid in the tire from tending to eject the plug therefrom.

Outer end 46 of the plug 16 is likewise deformed into an enlarged outer end. The enlarged outer end 46 serves as a means to restrain plug 16 against movement into the tire while the cement is setting. After driving on a tire repaired as above, the enlarged outer plug end becomes virtually vulcanized to the surrounding material of the tire.

It is contemplated that suitable lubricant, vulcanizing, rubber cement or other bonding agent may be used with plug 16. It will be readily understood that coating the cylindrical surface of plug 16 before it is inserted in the hole-expanding means will bond the plug under pressure to the side walls of the puncture hole when the tire repair device is removed. An effective pressure-tight seal is thus accomplished.

When repairing worn tires having reduced section or thin treads the hole expanding means 11 need not be inserted into a puncture hole 15 to cause abutment of edge 27 against the tire surface as directed above. Insertion to less depth will reduce enlargement of the puncture hole and that portion of the hole at the fabric cords. Thus in thin treads maximum utilization of the resiliency of the tire is retained to act upon a plug 16.

The advantages of the tire repair device described above will readily be apparent to those skilled in the art since a puncture may be conveniently repaired and tested without removal of the tire from the rim of the wheel. Furthermore, the use of a solid plug of resilient material provides a tight, non-leaking, non-removable plug seal which has not been heretofore accomplished.

It will be readily understood that various modifications and changes may be made in the construction of the hole-expanding means and of the plunger and stop means, and all such modifications and changes coming within the scope of the appended claims are embraced thereby.

I claim:

1. A puncture repair device for use with tubeless tires comprising, in combination: a puncture hole-expanding means provided with a bore having a chamber adapted to receive a solid cylindrical resilient plug, said hole-expanding means including a longitudinally split tapered end closing the bore at one end of the chamber and a pressure face at the opposite end of the chamber whereby insertion of said expanding means into a puncture hole is facilitated; a plunger means cooperable with the hole-expanding means including a plunger portion slidable in said bore and adapted to abut one end of a plug positioned in said chamber to press said plug into the tapered end; and stop means carried by the plunger means to limit movement of the plunger portion relative to the hole-expanding device and to longitudinally position the plug in a puncture hole being repaired, said stop means including a member extending parallel to the plunger portion and provided with an abutment face to contact the exterior surface of a tire to limit movement of said plunger toward the tire.

2. A device as stated in claim 1 wherein the end face of said plunger portion is spaced from said abutment faces of said stop means in a direction away from the exterior surface of a tire.

3. A repair device for a hole in a hollow resilient pressure member having a resilient wall of predetermined thickness, comprising: a hole-expanding means including a guide sleeve adapted to be inserted into a hole to be repaired and to extend through said hole, said guide sleeve being adapted to receive a plug therein; a plunger means to push said plug in said guide sleeve into a longitudinal position whereby ends of said plug are disposed at interior and exterior surfaces of said resilient wall; and means including a U-shaped member connected with said plunger means and provided with surfaces for abutment with the exterior surface of said tire to limit movement of the plunger means so as to locate the plug in a predetermined position, said plunger means holding said plug in said position while said hole-expanding means is withdrawn from said hole.

4. A repair device for a hole in a hollow pressure member having a resilient wall of predetermined thickness, comprising: means for expanding said hole and including a guide sleeve, said guide sleeve being adapted to receive a resilient plug therein; means including a plunger element for reception within said guide sleeve for pressure engagement with said plug; and means exterior of said guide sleeve for engagement with said wall and connected to said plunger element to limit movement of said plunger element so as to locate the plug in a predetermined position, said plunger element holding said plug while said guide sleeve is withdrawn.

References Cited in the file of this patent

UNITED STATES PATENTS

| | | |
|---|---|---|
| 550,560 | Myers | Nov. 26, 1895 |
| 594,869 | Griswold | Dec. 7, 1897 |
| 607,379 | Jones | July 12, 1898 |
| 639,986 | Issbills | Dec. 26, 1899 |
| 725,171 | Sutton | Apr. 14, 1903 |
| 1,348,005 | Hirst | July 27, 1920 |
| 2,095,931 | Kraft | Oct. 12, 1937 |
| 2,293,374 | Wesseler | Aug. 18, 1942 |
| 2,468,286 | Behlert | Apr. 26, 1949 |
| 2,638,961 | Everett | May 19, 1953 |